United States Patent
Chlystek et al.

(10) Patent No.: US 10,724,562 B2
(45) Date of Patent: Jul. 28, 2020

(54) LINE SECUREMENT LOCK

(71) Applicant: ILLINOIS TOOL WORKS INC., Glenview, IL (US)

(72) Inventors: Thomas Michael Chlystek, Darien, IL (US); Tao Wang, Yokosuka Kanagawa (JP)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/365,072

(22) Filed: Mar. 26, 2019

(65) Prior Publication Data

US 2019/0301500 A1 Oct. 3, 2019

Related U.S. Application Data

(60) Provisional application No. 62/648,742, filed on Mar. 27, 2018.

(51) Int. Cl.
| | |
|---|---|
| *F16B 7/04* | (2006.01) |
| *B60R 16/08* | (2006.01) |
| *B60R 16/02* | (2006.01) |

(52) U.S. Cl.
CPC ........ *F16B 7/0433* (2013.01); *B60R 16/0215* (2013.01); *B60R 16/08* (2013.01)

(58) Field of Classification Search
CPC .... F16B 7/0433; B60R 16/0215; B60R 16/08
See application file for complete search history.

(56) References Cited

U.S. PATENT DOCUMENTS

| | | | | |
|---|---|---|---|---|
| 3,913,187 A * | 10/1975 | Okuda | ................... | F16L 3/1075 24/484 |
| 4,195,807 A * | 4/1980 | Llauge | ...................... | F16L 3/10 174/175 |
| 4,291,855 A * | 9/1981 | Schenkel | .................. | F16L 3/12 248/74.1 |
| 4,917,340 A * | 4/1990 | Juemann | .................... | F16L 3/13 248/74.2 |
| 5,230,496 A * | 7/1993 | Shillington | ......... | A61M 5/1418 24/487 |
| 6,978,973 B1 * | 12/2005 | Gretz | ..................... | F16L 3/1203 248/74.1 |
| 7,201,351 B2 * | 4/2007 | Stigler | .................. | F16L 3/1008 24/16 PB |
| 7,240,880 B2 * | 7/2007 | Benoit | ...................... | F16L 3/13 24/555 |
| 7,614,589 B2 * | 11/2009 | Kato | ....................... | F16L 3/223 248/55 |
| 8,973,880 B2 * | 3/2015 | Goffman | .................. | B62J 11/00 248/230.4 |
| 9,127,740 B2 * | 9/2015 | Shinoda | ..................... | F16F 7/12 |
| 9,541,223 B2 * | 1/2017 | Meyers | ............... | B29C 45/0017 |
| 10,281,061 B2 * | 5/2019 | Atragene | ................... | F16L 3/24 |

* cited by examiner

*Primary Examiner* — Anita M King
(74) *Attorney, Agent, or Firm* — Quarles & Brady LLP (57) ABSTRACT

A line retainer includes a bridge portion, a first arm, and a second arm. The first arm extends from the bridge portion and includes a locking portion. The second arm extends from the bridge portion and includes a retaining barb. The retaining barb extends toward the locking portion and is configured to catch the locking portion.

20 Claims, 5 Drawing Sheets

LINE SECUREMENT LOCK

RELATED APPLICATION

This application claims the benefit of U.S. Provisional Application No. 62/648,742 filed on Mar. 27, 2018, which is hereby incorporated by reference in its entirety.

FIELD OF THE DISCLOSURE

This disclosure relates generally to tubing retainers and, more particularly, to a line securement lock.

BACKGROUND

In recent years, retainers have been developed to securely fasten tubing, cables, wiring, etc. to a substrate. For example, vehicles have various tubes (e.g., for fuel, coolant, washer fluid, etc.) and electrical wiring (e.g., for lights, power windows, electronic controls, etc.) routed through the body of the vehicle. The tubes and electrical wiring are secured in a retainer, which is secured to the body. Thus, the tubes and electrical wiring are secured to the body.

Certain known retainers are configured to snap into an opening defined in the substrate and have outwardly-extending posts with inwardly-pointing flexible barbs, sometimes referred to as rabbit ears. When a tube is pushed into the retainer, the flexible barbs flex relative to the posts to accommodate the tube and resiliently snap back to retain the tube.

However, these known retainers require a significant outwardly-extending height relative to the body to keep the flexible barbs at an acute angle relative to the posts to retain the tube and/or wiring.

Other known retainers include a clamping cover pivotably connected to a buckle. The buckle is fastened to the body of the vehicle. Tubes and/or wiring are placed in the buckle and the clamping cover is pivoted relative to the buckle to snap into same to retain the tubes and/or wiring.

However, these other known retainers require the subsequent secondary operation of snapping the clamping cover into the buckle to secure the tubes and/or wiring.

Therefore, a need exists for a retainer that is low profile relative to a substrate into which tubes and/or wiring may be introduced and retained in a single operation.

SUMMARY

In one aspect, a line retainer is disclosed which includes a bridge portion, a first arm, and a second arm. The first arm extends from the bridge portion and includes a locking portion. The second arm extends from the bridge portion and includes a retaining barb. The retaining barb extends toward the locking portion and is configured to catch the locking portion.

In another aspect of the line retainer, the first arm includes a first lower portion connected to the bridge portion and a first upper portion connected to the first lower portion and the locking portion. The second arm includes a second lower portion connected to the bridge portion and a second upper portion connected to the second lower portion and the retaining barb.

In another aspect of the line retainer, the first lower portion and the first upper portion are recurved relative to one another and the second lower portion and the second upper portion are recurved relative to one another.

In another aspect of the line retainer, the first lower portion extends arcuately from the bridge portion toward the second lower portion and the second lower portion extends arcuately from the bridge portion toward the first lower portion.

In another aspect of the line retainer, the first upper portion extends arcuately from the first lower portion away from the second upper portion and the second upper portion extends arcuately from the second lower portion away from the first upper portion.

In another aspect of the line retainer, the locking portion is resiliently connected to the first lower portion via the first upper portion.

In another aspect of the line retainer, when the locking portion moves away from the first lower portion, the locking portion approaches the retaining barb.

In another aspect of the line retainer, the first upper portion and the second upper portion define a bell-shaped gap.

In another aspect of the line retainer, the locking portion and the retaining barb extend into the bell-shaped gap.

In another aspect, the line retainer also includes a first post extending from the bridge portion and a second post extending from the bridge portion, wherein the first arm and the second arm are between the first post and the second post.

In another aspect of the line retainer, the first arm is connected to and extends from the first post and the second arm is connected to and extends from the second post.

In another aspect of the line retainer, the first post extends farther from the bridge portion than the first arm and the second arm and the second post extends farther from the bridge portion than the first arm and the second arm.

In another aspect of the line retainer, the first arm includes a first knob extending oppositely relative to the locking portion and the second arm includes a second knob extending oppositely relative to the retaining barb.

In another aspect, the line retainer also includes a bumper engaged with the first arm, the second arm, and the bridge portion.

In another aspect of the line retainer, the first arm, the bridge portion, and the second arm define a round opening.

In a second aspect, a line retainer includes a bridge portion, a first arm, and a second arm. The first arm extends from the bridge portion and includes a locking portion. The second arm extends from the bridge portion and includes a hook portion. The hook portion is disposed between the locking portion and the bridge portion and is configured to catch the locking portion.

In a third aspect, a line retainer includes a bridge portion, a first arm, and a second arm. The first arm includes a first lower portion and a locking portion. The second arm includes a second lower portion and a retaining portion configured to catch the locking portion. The first and second lower portions define a round opening.

DETAILED DESCRIPTION

As explained herein, the present disclosure provides a line securement lock that has a relatively small profile relative to a substrate. Further, tubes and/or electrical wiring may be introduced into and retained in the line securement lock in a single operation. As a non-limiting example, the line securement lock may be configured as a line retainer to snapably engage with the substrate and with tubes, electrical wiring, cables, etc.

Figure 1:
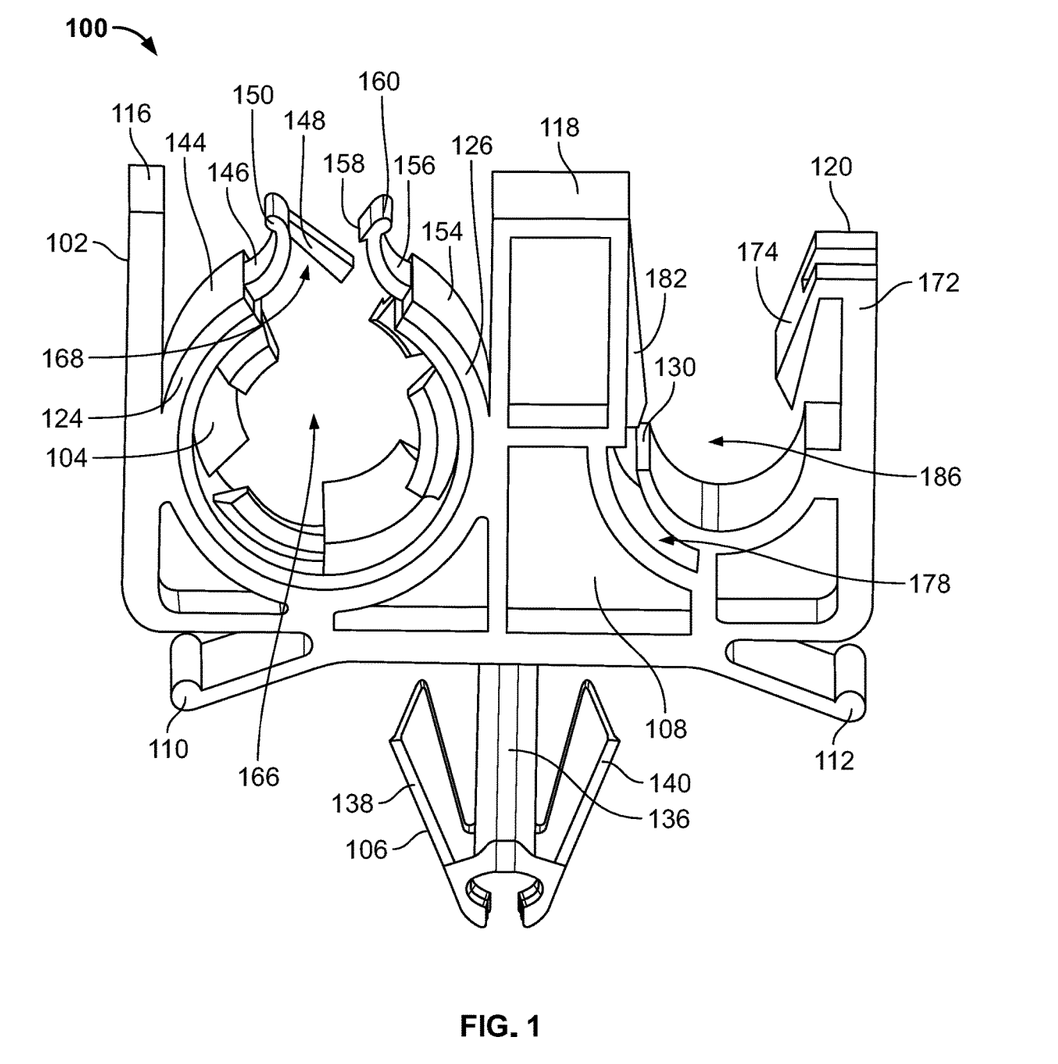
FIG. 1 is an isometric view of a line retainer, according to a first exemplary embodiment.

With reference to FIG. 1, a first example line retainer 100 includes a body 102 and a bumper 104. The body 102 includes a snap insert 106, a bridge portion 108, a first pad extension 110, a second pad extension 112, a first post 116, a second post 118, a rabbit ear 120, a first arm 124, a second arm 126, and a third arm 130. In some embodiments, the line retainer 100 is made of stiff plastic (e.g., polyoxymethylene (POM), acrylonitrile butadiene styrene (ABS), nylon, polyethylene, etc.). In some embodiments, the bumper 104 is made of an elastomer (e.g., natural rubber, polyisoprene, polybutadiene, polychloroprene, butyl rubber, nitrile rubber, etc.). In some embodiments, the body 102 is formed as a single integral unit (e.g., molded in one piece).

Referring still to FIG. 1, the snap insert 106 is connected to and extends generally perpendicularly outwardly from the bridge portion 108. The first and second pad extensions 110, 112 are connected to and extend diagonally from the bridge portion 108. The snap insert 106 is between the first and second pad extensions 110, 112. The first post 116, the second post 118, and the rabbit ear 120 are connected to and extend generally perpendicularly from the bridge portion 108. The first post 116, the second post 118, and the rabbit ear 120 are opposite of the first pad extension 110, the snap insert 106, and the second pad extension 112. In other words, the first post 116, the second post 118, and the rabbit ear 120 extend upwardly from the bridge portion 108 and the first pad extension 110, the snap insert 106, and the second pad extension 112 extend downwardly from the bridge portion 108.

Referring still to FIG. 1, the snap insert 106 includes a third post 136, a first substrate barb 138, and a second substrate barb 140. The third post 136 is connected to and extends downwardly generally perpendicularly from the bride portion 108. The first substrate barb 138 and the second substrate barb 140 are connected to and extend diagonally upwardly from the third post 136.

Figure 2:
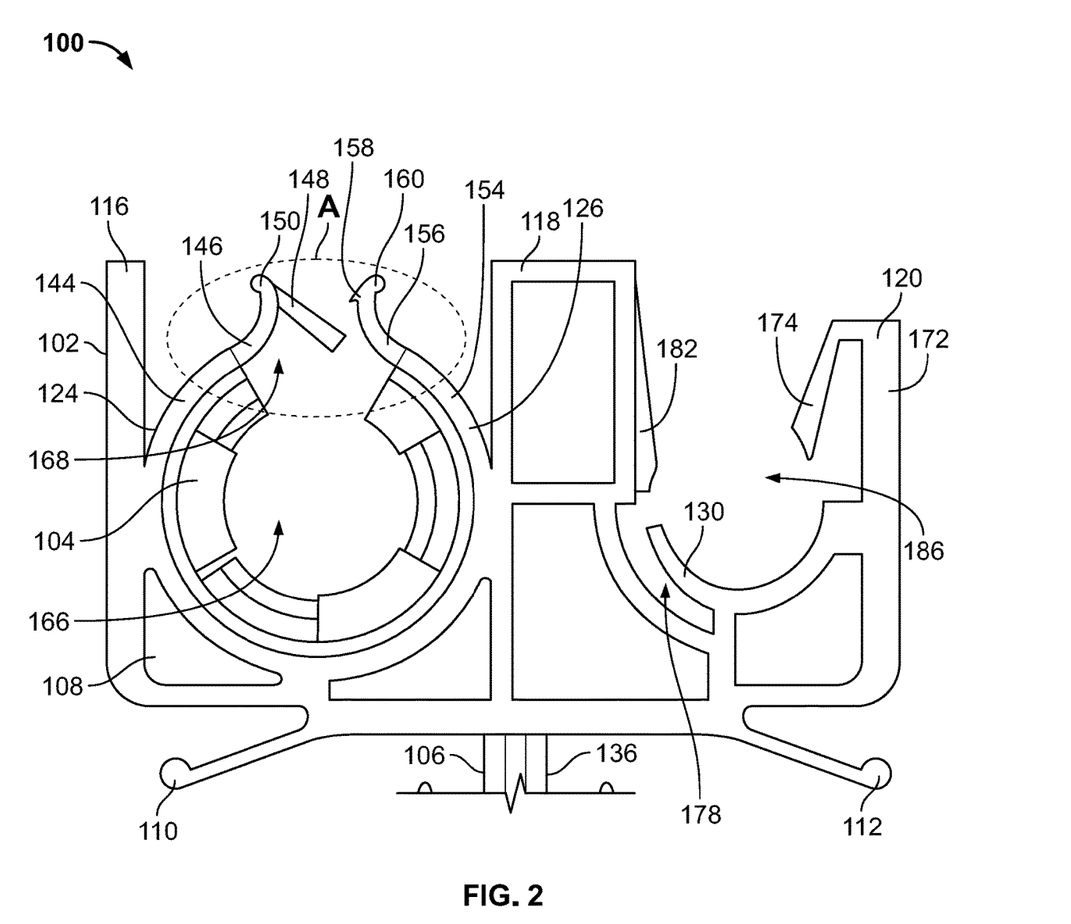
FIG. 2 is a partial elevational view of the line retainer of FIG. 1.

With reference to FIGS. 1 and 2, the first arm 124 is connected to the bridge portion 108 and the first post 116. The first arm 124 extends curvilinearly from the bridge portion 108 and the first post 116. Similarly, the second arm 126 is connected to the bridge portion 108 and the second post 118. The second arm 126 extends curvilinearly from the bridge portion 108 and the second post 118. The first post 116, the second post 118, and the rabbit ear 120 extend farther from the bridge portion 108 than the first arm 124, the second arm 124, and the third arm 130.

Referring still to FIGS. 1 and 2, the first arm 124 includes a first lower portion 144, a first upper portion 146, a locking portion 148, and a first knob 150. Similarly, the second arm 126 includes a second lower portion 154, a second upper portion 156, a retaining barb 158, and a second knob 160. The first lower portion 144 is connected to and arcuately extends from the bridge portion 108 and the first post 116 toward the second post 118 and the second lower portion 154. The second lower portion 154 is connected to and arcuately extends from the bridge portion 108 and the second post 118 toward the first post 118 and the first lower portion 144. The first lower portion 144, the bridge portion 108, and the second lower portion 154 define a first opening 166. In the illustrated example, the first opening 166 is round (e.g., generally circular or ovate). It should be understood that the first opening 166 may be any shape (e.g., circular, elliptical, ovate, polygonal, curvilinear, etc.). The bumper 104 is engaged with the first lower portion 144, the bridge portion 108, and the second lower portion 154 in the first opening 166. Thus, the first lower portion 144, the bridge portion 108, and the second lower portion 154 are configured to receive a line having a generally circular cross-section (e.g., tubing or wiring).

Figure 3:
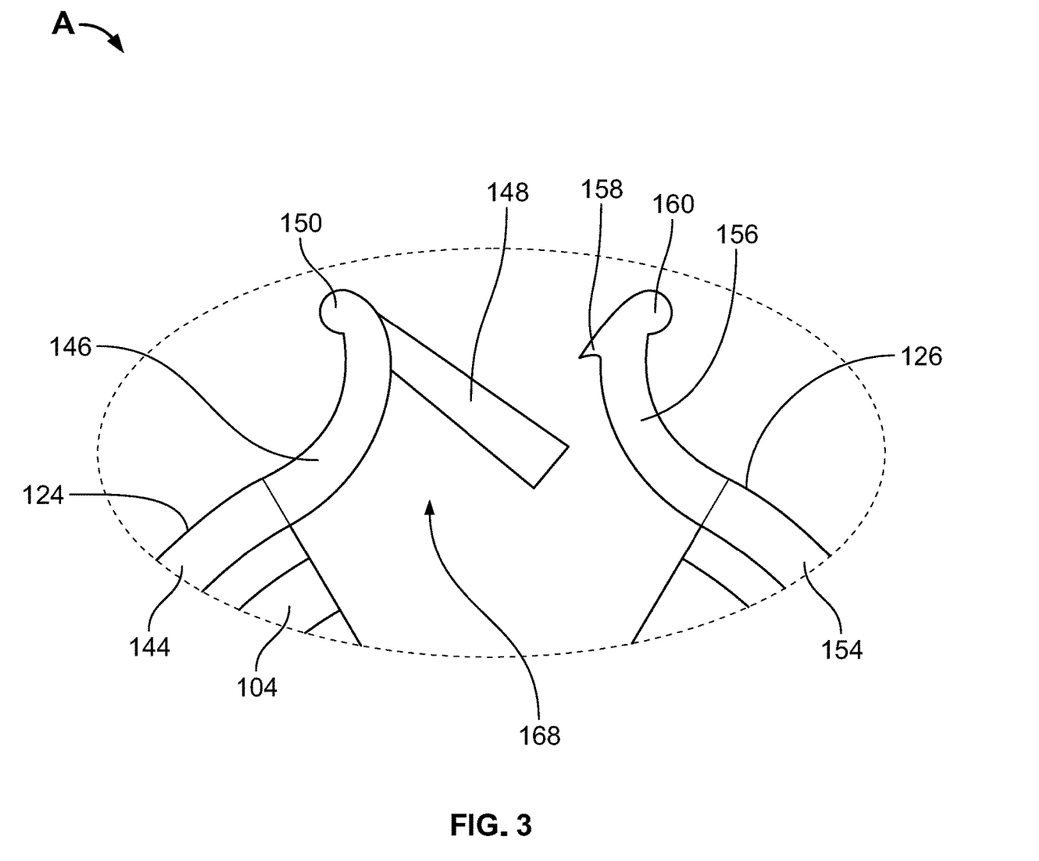
FIG. 3 is an enlarged partial elevational view of the line retainer of FIGS. 1 and 2 taken from section A of FIG. 2.

Referring to FIGS. 1-3, the first upper portion 146 is connected to and extends arcuately from the first lower portion 144 toward the first post 116. Thus, the first upper portion 146 is curved oppositely relative to the first lower portion 144. In other words, the first lower portion 144 and the first upper portion 146 are recurved relative to one another. The first upper portion 146 is resiliently pivotable relative to the first lower portion 144. The first knob 150 is connected to and extends from first upper portion 146 toward the first post 116. The locking portion 148 is connected to and extends from the first upper portion 146 toward the second lower portion 154. Thus, the first knob 150 and the locking portion 148 extend oppositely from one another. The locking portion 148 is resiliently pivotable relative to the first upper portion 146. Thus, the locking portion 148 is resiliently connected to the first lower portion 144 via the first upper portion 146.

Looking still at FIGS. 1-3, the second upper portion 156 is connected to and extends arcuately from the second lower portion 154 toward the second post 118. Thus, the second upper portion 156 is curved oppositely relative to the second lower portion 154. In other words, the second lower portion 154 and the second upper portion 156 are recurved relative to one another. The second upper portion 156 is resiliently pivotable relative to the second lower portion 154. The second knob 160 is connected to and extends from second upper portion 156 toward the second post 118. The retaining barb 158 is connected to and extends from the second upper portion 156 toward the first lower portion 144. Thus, the second knob 160 and the retaining barb 158 extend oppositely from one another.

Referring to FIGS. 1-3, the first and second upper portions 146, 156 define a generally bell-shaped first gap 168. The first gap 168 is in communication with the first opening 166. The locking portion 148 and the retaining barb 158 extend into the first gap 168. The retaining barb 158 extends toward the locking portion 148.

With reference to FIGS. 1 and 2, the rabbit ear 120 includes a fourth post 172 and a tube barb 174. The fourth post 172 is connected to and extends from the bridge portion 108. The tube barb 174 is connected to the fourth post 172 and extends toward the bridge portion 108. The third arm 130 is connected to and extends arcuately from the bridge portion 108 toward the second post 118. Thus, the third arm 130, the bridge portion 108, and the second post 118 define a second gap 178. Further, the second post 118 includes a guide tab 182. The guide tab 182 extends toward the rabbit ear 120. Thus, the guide tab 182, the third arm 130, the bridge portion 108, and the tube barb 174 define a partially circular second opening 186. Further, the guide tab 182, the third arm 130, the bridge portion 108, and the tube barb 174 are configured to receive a line having a generally circular cross-section.

With reference to FIGS. 1-3, in operation, a first line (not shown) may be inserted into the line retainer 100. More specifically, the first line may be pushed against the line retainer 100 to contact the first and second upper portions 146, 156. It should be appreciated that the first and second knobs 150, 160 aid in guiding the first line toward the first gap 168. As the first line is pushed against the first upper portion 146, the locking portion 148 bends toward the first upper portion 146 and the first upper portion 146 bends toward the first post 116. Further, as the first line is pushed against the second upper portion 156, the second upper portion 156 bends toward the second post 118. Thus, the first line pushes the first and second upper portions 146, 156 away from one another to temporarily widen and pass through the first gap 168 into the first opening 166. Once the first line is inserted into the first opening 166 to rest against the bumper 104, the first and second upper portions 146, 156 and the locking portion 148 resiliently relax. It should also be appreciated that the bumper 104 aids in preventing axial movement of the line relative to the body 102. When the locking portion 148 moves away from the first lower portion 144, the locking portion 148 approaches the retaining barb and vice versa. For example, if the first line is pulled away from the bridge portion 108, the first line pushes the locking portion 148 against the retaining barb 158, which inhibits further movement of the first line. In other words, the retaining barb 158 is configured to catch the locking portion 148. Thus, the first line is secured in the first opening 166.

With reference to FIGS. 1-3, further in operation, a second line (not shown) may be inserted into the line retainer 100. More specifically, the second line may be pushed against the line retainer 100 to contact the guide tab 182 and the tube barb 174. As the second line is pushed against the tube barb 174, the tube barb 174 bends toward the fourth post 172. Thus, the second line passes into the second opening 186 and contacts the third arm 130. As the second line is pushed against the third arm 130 to narrow the second gap 178, the tube barb 174 resiliently relaxes. Thus, the second line is compressed between the third arm 130 and the tube barb 174. If the first line is pulled away from the bridge portion 108, the tube barb 174 inhibits further movement of the second line. Thus, the second line is secured in the second opening 186.

Looking specifically at FIG. 1, further in operation, the snap insert 106 is pushed into an opening defined in a substrate (not shown). More specifically, as the first and second substrate barbs 138, 140 are pushed through the opening, the first and second substrate barbs 138, 140 pivot toward one another. Once the first and second substrate barbs 138, 140 traverse the opening, the first and second substrate barbs 138, 140 resiliently relax and engage the substrate. Further, the first and second pad extensions 110, 112 contact the substrate to hold the first and second substrate barbs 138, 140 and the third post 136 in tension.

Figure 4:
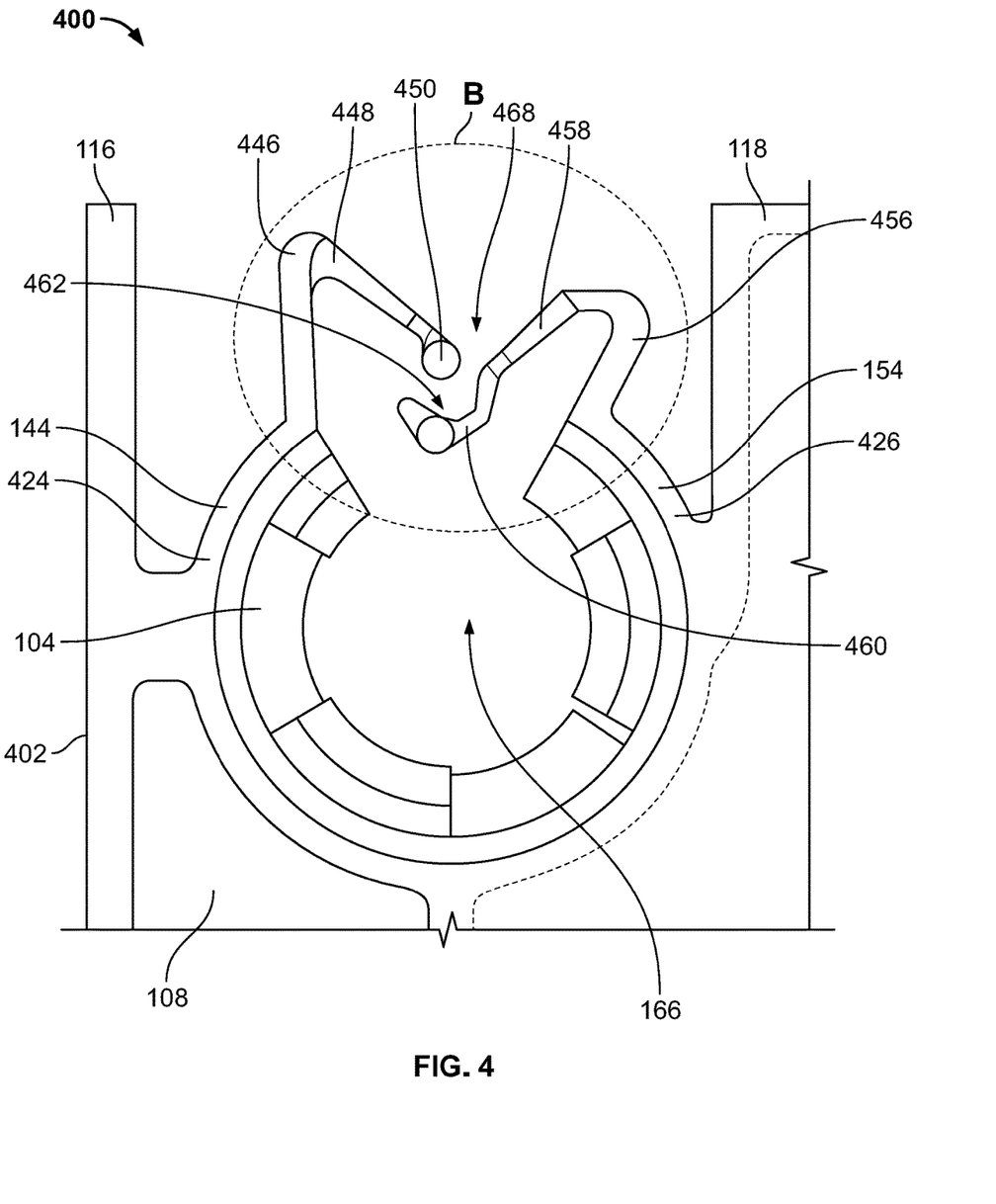
FIG. 4 is a partial elevational view of another line retainer, according to a second exemplary embodiment.

With reference to FIG. 4, a second example line retainer 400 includes a body 402 and the bumper 104. It should be understood that the body 402 is structurally similar to the body 102 of the first example line retainer 100. The body 402 includes the bridge portion 108, the first post 116, and the second post 118, a first arm 424, and a second arm 426. The body 402 also includes the snap insert 106, the first pad extension 110, the second pad extension 112, and the rabbit ear 120 shown in FIGS. 1 and 2.

With reference to FIG. 4, the first arm 424 is connected to the bridge portion 108 and the first post 116. The first arm 424 extends curvilinearly from the bridge portion 108 and the first post 116. Similarly, the second arm 426 is connected to the bridge portion 108 and the second post 118. The second arm 426 extends curvilinearly from the bridge portion 108 and the second post 118.

Referring still to FIG. 4, the first arm 424 includes the first lower portion 144, a first upper portion 446, a locking portion 448, and a first knob 450. Similarly, the second arm 426 includes the second lower portion 154, a second upper portion 456, a branch portion 458, and a hook portion 460. The first lower portion 144 is connected to and arcuately extends from the bridge portion 108 and the first post 116 toward the second post 118 and the second lower portion 154. The second lower portion 154 is connected to and arcuately extends from the bridge portion 108 and the second post 118 toward the first post 118 and the first lower portion 144. The first lower portion 144, the bridge portion 108, and the second lower portion 154 define the generally circular first opening 166. The bumper 104 is engaged with the first lower portion 144, the bridge portion 108, and the second lower portion 154 in the first opening 166. Thus, the first lower portion 144, the bridge portion 108, and the second lower portion 154 are configured to receive a line having a generally circular cross-section (e.g., tubing or wiring).

Figure 5:
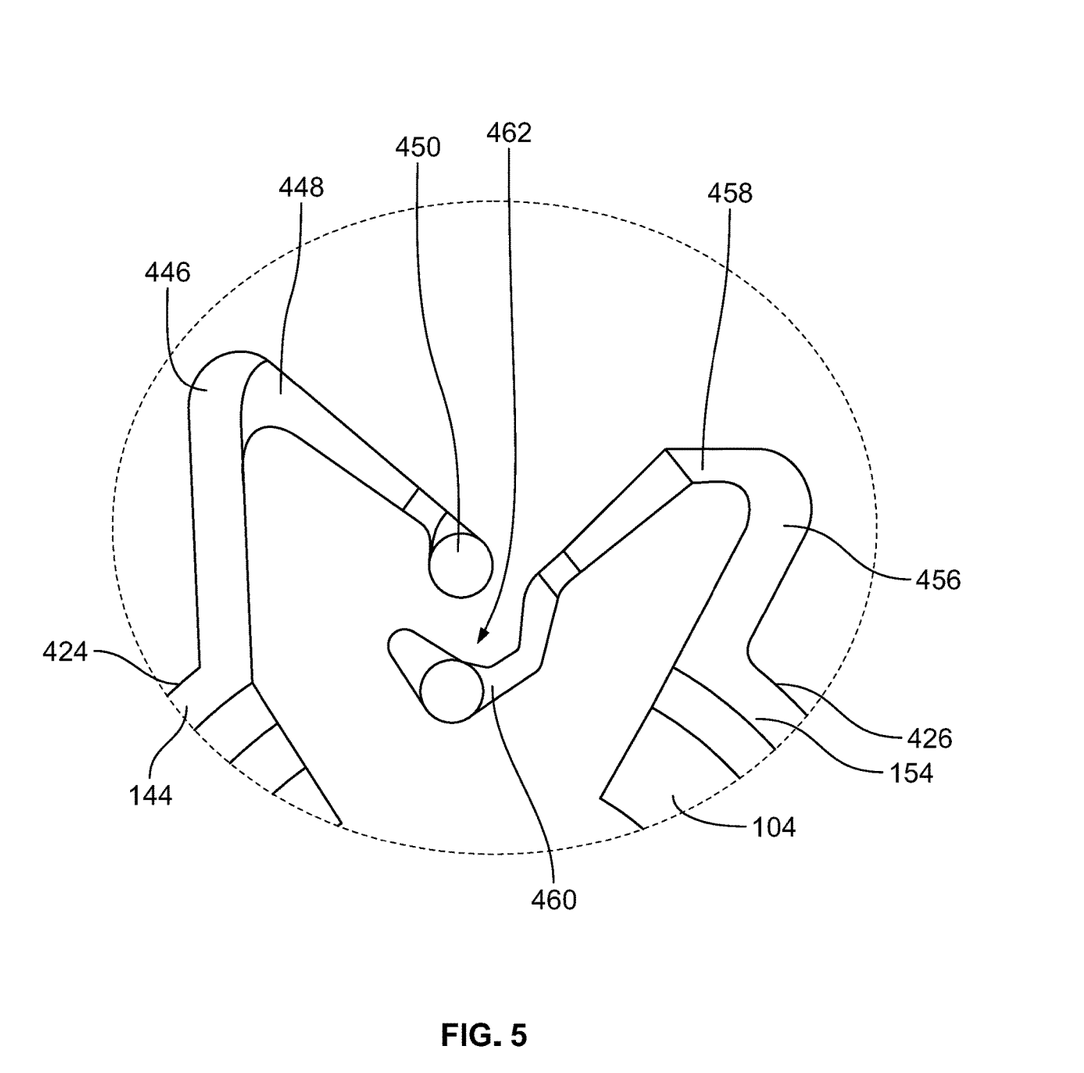
FIG. 5 is an enlarged partial elevational view of the line retainer of FIG. 4 taken from section B of FIG. 4.

Referring to FIGS. 4 and 5, the first upper portion 446 is connected to and extends generally outwardly from the first lower portion 144. The first upper portion 446 is resiliently pivotable relative to the first lower portion 144. The locking portion 448 is connected to and extends from the first upper portion 446 toward the second lower portion 154. The first knob 450 is connected to and extends from the locking portion 448 toward the second lower portion 154. The locking portion 448 is resiliently pivotable relative to the first upper portion 446.

Looking still at FIGS. 4 and 5, the second upper portion 456 is connected to and extends diagonally outwardly from the second lower portion 154 toward the second post 118. The second upper portion 456 is resiliently pivotable relative to the second lower portion 154. The branch portion 458 is connected to and extends from the second upper portion 456 toward the first lower portion 144. The hook portion 460 is connected to and extends from the branch portion 458 toward the first lower portion 144. The hook portion 460 defines a channel 462. The channel 462 is open toward the first knob 450. The hook portion 460 is configured to receive the first knob 450 in the channel 462.

Referring to FIG. 4, the first and second upper portions 446, 456 define a generally trapezoidal first gap 468. The first gap 468 is in communication with the first opening 166. The locking portion 448, the first knob 450, the branch portion 458, and the hook portion 460 extend into the first gap 468.

With reference to FIGS. 4 and 5, in operation, a line (not shown) may be inserted into the line retainer 400. More specifically, the line may be pushed against the line retainer 400 to contact the locking portion 448 and the branch portion 458. As the line is pushed against the locking portion 448, the locking portion 448 bends toward the first upper portion 446 and the first upper portion 446 bends toward the first post 116. Further, as the first line is pushed against the branch portion 458, the branch portion 458 bends toward the second upper portion 456, the hook portion 460 moves toward the second upper portion 456, and the second upper portion 456 bends toward the second post 118. Thus, the line pushes the locking portion 448 and the first upper portion 446 away from the branch portion 458, the hook portion 460, and the second upper portion 456 to temporarily widen and pass through the first gap 468 into the first opening 166. Once the line is inserted into the first opening 166 to rest against the bumper 104, the first and second upper portions 446, 456, the branch portion 458, and the locking portion 448 resiliently relax. It should also be appreciated that the bumper 104 aids in preventing axial movement of the line relative to the body 402. When the hook portion 460 moves away from the second lower portion 154, the hook portion 460 approaches the locking portion 448 and the first knob 450 and vice versa. For example, if the line is pulled away from the bridge portion 108, the line pushes the hook portion 460 against the locking portion 448 to catch and retain the first knob 450 in the channel 462, which inhibits further movement of the first line. In other words, the locking portion 448 and the hook portion 460 work together to resist pull-out of the line from the first opening 166. Thus, the first line is secured in the first opening 166.

From the foregoing, it will be appreciated that the above disclosed first and second example line retainers 100, 400 obviate the need to configure line retainers with relatively long posts to support rabbit ear barbs and/or clamping covers. Thus, the first and second example line retainers 100, 400 may be lighter than known line retainers and materials used to produce the disclosed first and second example line retainers 100, 400 may be conserved. Additionally, where the first and/or second example line retainers 100, 400 are installed in a vehicle, vehicle fuel economy may be increased because the first and second example line retainers 100, 400 are lighter than known line retainers. Further, lines may be assembled into the disclosed first and second example line retainers 100, 400 in one single operation. Thus, the disclosed first and second example line retainers 100, 400 may be more comfortable, more reliable, and simpler for individuals to use.

While various spatial and directional terms, such as top, bottom, lower, mid, lateral, horizontal, vertical, front and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the examples disclosed and defined herein extend to all alternative combinations of two or more of the individual features mentioned or evident from the text and/or drawings. All of these different combinations constitute various alternative aspects of the present disclosure. The examples described herein explain the best modes known for practicing the disclosure and will enable others skilled in the art to utilize the disclosure. The claims are to be construed to include alternative examples to the extent permitted by the prior art.

What is claimed is:

1. A line retainer, comprising:
a bridge portion;
a first arm extending from the bridge portion and including a locking portion; and
a second arm extending from the bridge portion and including a retaining barb, wherein
the first arm and the second arm define a gap,
the locking portion extends inwardly into the gap toward the bridge portion,
the retaining barb extends inwardly into the gap toward the locking portion and toward the bridge portion, and
the retaining barb is configured to catch the locking portion as the locking portion moves away from the bridge portion through the gap.

2. The line retainer of claim 1, wherein:
the first arm includes
a first lower portion connected to the bridge portion, and
a first upper portion connected to the first lower portion and the locking portion, and
the second arm includes
a second lower portion connected to the bridge portion, and
a second upper portion connected to the second lower portion and the retaining barb.

3. The line retainer of claim 2, wherein:
the first lower portion and the first upper portion are recurved relative to one another, and
the second lower portion and the second upper portion are recurved relative to one another.

4. The line retainer of claim 2, wherein the locking portion is resiliently connected to the first lower portion via the first upper portion.

5. The line retainer of claim 4, wherein when the locking portion moves away from the first lower portion, the locking portion approaches the retaining barb.

6. The line retainer of claim 2, wherein the locking portion and the retaining barb extend into the gap.

7. The line retainer of claim 1, wherein:
the first arm includes a first knob extending oppositely relative to the locking portion; and
the second arm includes a second knob extending oppositely relative to the retaining barb.

8. A line retainer, comprising:
a bridge portion;
a first arm extending from the bridge portion and including a locking portion; and
a second arm extending from the bridge portion and including a hook portion, wherein
the first arm and the second arm define a gap,
the locking portion extends inwardly into the gap toward the bridge portion and toward the hook portion,
the hook portion is disposed between the locking portion and the bridge portion,
the hook portion extends inwardly into the gap toward the bridge portion, and
the hook portion is configured to catch the locking portion as the hook portion moves away from the bridge portion through the gap.

9. The line retainer of claim 8, wherein the hook portion defines a channel.

10. The line retainer of claim 9, wherein the channel is open toward the locking portion.

11. The line retainer of claim 8, wherein the hook portion catches a knob of the locking portion when the hook portion moves away from the bridge portion.

12. The line retainer of claim 8, wherein:
the first arm includes
a first lower portion connected to the bridge portion, and
a first upper portion connected to the first lower portion and the locking portion and
the second arm includes a second lower portion connected to the bridge portion, and a second upper portion connected to the second lower portion and the hook portion.

13. The line retainer of claim 12, wherein:

the first lower portion extends arcuately from the bridge portion toward the second lower portion, and the second lower portion extends arcuately from the bridge portion toward the first lower portion.

14. The line retainer of claim 12, wherein:

the first upper portion extends outwardly from the first lower portion, and the second upper portion extends diagonally outwardly from the second lower portion.

15. The line retainer of claim 12, wherein:

the first upper portion is resiliently pivotable relative to the first lower portion, and the second upper portion is resiliently pivotably relative to the second lower portion.

16. The line retainer of claim 12, wherein the locking portion is resiliently pivotable relative to the first upper portion, the hook portion connected to the second upper portion via a branch portion, and the branch portion is resiliently pivotable relative to the second upper portion.

17. The line retainer of claim 12, wherein:

the first upper portion and the second upper portion define the gap, and the gap is trapezoidal.

18. The line retainer of claim 12, wherein:

the first lower portion and the second lower portion define an opening, and the opening is in communication with the gap.

19. A line retainer, comprising:

a bridge portion;

a first arm including a first lower portion and a locking portion; and a second arm including a second lower portion and a retaining portion configured to catch the locking portion, wherein the first and second lower portions define a round opening, the first arm and the second arm define a gap, the gap is in communication with the round opening, the locking portion extends inwardly into the gap toward the bridge portion, and the retaining portion extends inwardly into the gap toward the bridge portion.

20. The line retainer of claim 19, further comprising a bumper disposed in the round opening.

* * * * *